United States Patent [19]

Juergens

[11] 4,212,179
[45] Jul. 15, 1980

[54] DRIVEN MANDREL AND METHOD

[75] Inventor: Tristan D. Juergens, Conifer, Colo.

[73] Assignee: The Gates Rubber Company, Denver, Colo.

[21] Appl. No.: 950,656

[22] Filed: Oct. 12, 1978

[51] Int. Cl.³ ............................................. B21C 47/02
[52] U.S. Cl. .................................... 72/148; 29/623.1; 29/731
[58] Field of Search ................. 29/623.1, 731; 72/135, 72/146, 147, 148; 242/DIG. 3, 56.1, 67.1 R, 67.5; 429/94

[56] References Cited

U.S. PATENT DOCUMENTS

| 147,679 | 2/1874 | Nichols et al. ........................ 72/146 |
| 317,487 | 5/1885 | Barrier et al. ........................... 429/94 |
| 2,212,243 | 8/1940 | Paul ........................................ 72/148 |
| 3,153,180 | 10/1964 | Bellmore ........................ 242/56.1 X |
| 4,064,725 | 12/1977 | Hug et al. ............................... 72/147 |
| 4,099,401 | 7/1978 | Hug et al. ............................... 72/147 |

FOREIGN PATENT DOCUMENTS 1181821 11/1964 Fed. Rep. of Germany .......... 242/56.1

Primary Examiner—Ervin M. Combs
Attorney, Agent, or Firm—Curtis H. Castleman, Jr.; Raymond Fink; H. W. Oberg, Jr.

[57] ABSTRACT

A mandrel useful in the spiral winding of flexible strip members is described including a pair of juxtaposed curvilinear perimetric driving portions which are offset laterally relative to one another and which have a slot or slots for receiving the elements to be wound. A process and winder are also described for the spiral winding of the strip members into a coiled element, e.g., a coiled capacitor or spirally wound battery cell pack.

15 Claims, 7 Drawing Figures

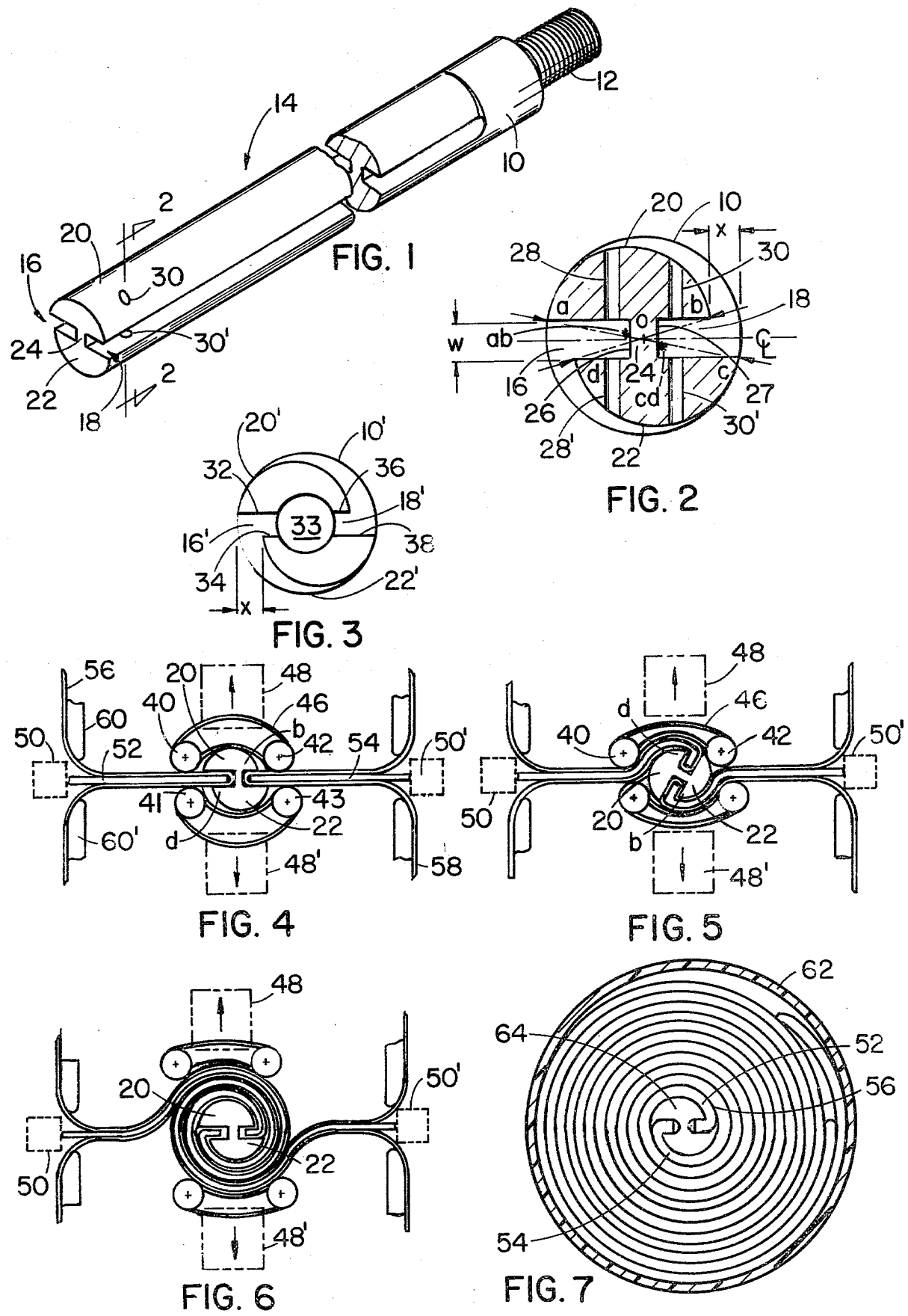
U.S. Patent Jul. 15, 1980 4,212,179

DRIVEN MANDREL AND METHOD

BACKGROUND OF THE INVENTION

This invention relates to a mandrel for winding together a plurality of flexible strip members into a coil or jelly-roll configuration, and to a method of winding using such mandrel.

In the production of coiled capacitors or spirally wound electrochemical cell packs consisting of opposite polarity plates and interposed separator or dielectric, various winding methods and mandrels have been employed. One method uses a driven mandrel (e.g., U.S. Pat. No. 3,298,871 to Binder et al), another employs a driven mandrel and idling pressure rolls (e.g., U.S. Pat. No. 3,839,088 to Hug et al). In still another method of winding, belts are employed together with a free turning solid mandrel, exemplified by U.S. Pat. No. 4,064,725 to Hug et al. The subject invention applies to the driven mandrel type, which may also advantageously employ sizing rolls with or without connecting belts to ensure winding of the element into the desired coiled form, such as an approximate archimedes spiral.

SUMMARY OF THE INVENTION

The mandrel of the invention includes a pair of driving portions whose perimeters are curvilinear in shape, and which are offset generally laterally from one another. The juxtaposed driving portions may be interconnected by an isthmus which thereby defines a pair of slots for receiving ends of flexible strip members to be wound, or alternatively the driving portions need not be interconnected other than at their base portion. The mandrel in conjunction with a plurality of retractable sizing rolls with or without associated belts define the winder.

In another aspect, the invention pertains to the method of winding together strip members to form a coiled element including the steps of (1) feeding the strip members from opposite directions into juxtaposed slots of a driving mandrel, the mandrel having laterally offset curvilinear driving surfaces terminating in generally pointed corners at the junctures with the respective slot openings, and thereafter (2) rotating the mandrel in the direction which wraps the strip members sharply around the pointed corners, and then continuing to rotate the mandrel until the coiled element is fully formed.

BRIEF DESCRIPTION OF THE DRAWINGS

The invention will be more particularly described in certain of its preferred embodiments by reference to the accompanying drawings, wherein like numerals designate like parts, and in which:

FIG. 1 is a perspective of one mandrel embodiment of the invention;

FIG. 2 is a cross section of the mandrel of FIG. 1 taken along section 2—2;

FIG. 3 is an end view, similar to FIG. 2, showing an alternative mandrel configuration;

FIGS. 4–6 are end views illustrating the method of winding according to the invention, in progressive intermediate stages of wind; and FIG. 7 is a cross-sectional view of an electrochemical cell having a cell pack spirally wound using the mandrel, winder and method according to the invention.

PREFERRED EMBODIMENTS OF THE INVENTION

The mandrel of the invention is useful in winding together in a generally spiral form a plurality of flexible strip members. For instance, capacitors consisting of coiled metal foils or plates separated by a paper or plastic film dielectric may be formed. By simply changing the shape of the mandrel, the geometry of the wound element may be changed from spiral to oval, or the like.

Without limitation, the subject invention will be discussed in detail as applied to the spiral winding of flexible lead-acid positive and negative battery plates, separated apart by interposed fiber glass based non-woven separator material. Such a battery and its components are more fully described in McClelland et al U.S. Pat. No. 3,862,861.

Referring first to FIGS. 1 and 2, the mandrel includes a shaft 10 having a threaded shank portion 12 or other means such as splines or a keyway for journaled engagement in a rotatable drive apparatus (not shown). The winding end 14 of the mandrel generally consists of juxtaposed driving portions 20 and 22 whose perimetric driving portions are generally curvilinear along the respective perimetric curves a-b for driving portion 20, and perimetric curves c-d for driving portion 22. These perimetric driving surfaces may be of any desired shape depending upon the intended shape of the coiled element; the shapes shown in FIGS. 1 and 2 will generate an approximate archimedes spiral with the finished element shown in section in FIG. 7.

Perimetric curves a-b and c-d of FIG. 2 are circular arcs determined by centers ab and cd, respectively. Alternatively, the arcs can be in the form of a true spiral, or curvilinear portions connected to an intermediate linear portion in the case where an oval cell pack cross section is desired, for instance.

In the embodiment of FIGS. 1 and 2, the curvilinear driving portions 20 and 22 are interconnected not only through the shaft 10 at their respective bases, but also through a preferably continuously extending isthmus 24. The sides of the isthmus 26 and 27 define, together with slots 16 and 18, bottoms or stops within the slots acting as positive locations for the leading edges of the flexible strip members to be wound. The isthmus also maintains the relative positioning and rigidity of the extended driving portion 14 of the mandrel during wind.

It is also preferred that the driving portions 20 and 22 be penetrated by aligning openings 28, 28' and 30, 30' which intersect the slot openings at a desired position adjacent the isthmus. The openings transmit a light beam (e.g., electric eye) therethrough to establish a light-controlled external circuit for controlling the mechanism feeding the flexible strip members into the slots of the mandrel, terminating the feed opposite the aligned openings.

In the embodiment of FIG. 3, no isthmus is employed. Each of the driving portions 20', 22', having respective outer curvilinear perimetric surfaces, are attached to a common base or shaft 10' as the sole interconnecting support. Each of the driving portion halves are also formed from tubular stock with axial void 33. A pair of entry slots 16', 18' are defined by facing strip receiving surfaces 32, 34 and 36, 38 respectively. As in the embodiment of FIGS. 1 and 2, the driving portions may be provided with aligning openings (not shown) to accommodate electric eyes controlling the extent to which the incoming flexible webs penetrate the openings 16', 18'.

In either of the embodiments of FIGS. 1 and 2 and FIG. 3, the respective driving portions 20 and 22 (or 20' and 22') are offset laterally with respect to one another. In other words, the respective driving portions are displaced or shifted laterally a distance "x" in a direction parallel to the centerline passing through the slot openings 16, 18 (or 16', 18'). It is preferred that the offset distance "x" be somewhat less than, more preferably from about 70 to about 85 percent of, the combined thickness of the components to be inserted in the corresponding slot (18) and wound (i.e., thickness of plate 54 plus twice the thickness of separator layer 58). Stated another way, the lateral offset distance is preferably from about 50 to about 90, more preferably from about 60 to about 80 percent of the width "w" of the corresponding slot. As a specific example, the offset distance may preferably be from about 0.060" to about 0.080".

The curvilinear perimetric surfaces of each of the driving portions 20, 22 terminate at one end (points b and d of FIG. 2) in a substantially sharp corner, i.e., at the slot entry edge, about which the flexible strip members are wound upon initial rotation of the mandrel.

In the winder of FIGS. 4–6, the mandrel of FIGS. 1 and 2 is employed. In addition, the winder includes a pair of sizing rollers 40, 42 and an optional endless belt 46 trained thereabout on both sides of the mandrel. The belt, which is disposed loosely about the rollers, overcomes an occasional tendency of the flexible strip members to pull out of the mandrel upon initial rotation. The sizing rolls 40, 42 and trained belt 46 are movable away from the mandrel in a programmed fashion through mechanical linkage shown schematically at 48, 48', which may be cam controlled or air operated, for instance. A known type of linkage for withdrawing the sizing roll head in the direction of the arrow shown, is disclosed in U.S. Pat. No. 4,064,725 referred to above.

The winding mechanism also includes plate and separator feeders 50, 50', such as that shown in U.S. Pat. No. 4,064,725.

In operation of the winder, thin rectangular plates 52 and 54 are fed flatwise and horizontally toward respective mandrel slots 16 and 18. The leading edges of each of the plates encounter flexible, compressible separator layers 56, 58 disposed across lead-in guides 60, 60', thereby enveloping each of the plates 52 and 54 in a sandwich configuration. As the plate feeding mechanisms 50, 50' advance the plate/separator sandwiches into the mandrel slots 16 and 18, electric eye mechanisms operating through the aligning openings 28, 28' and 30, 30' automatically halt the advancement of the leading edges. The sizing rollers 40, 42 and belt 46 are then brought into the ready position shown in FIG. 4. As shown, the pair of rollers 40, 42 are offset laterally from the other pair of rollers 41, 43 much the same as driving portions of the mandrel are offset.

At this point a drive means (not shown) rotates the mandrel in a clockwise sense whereby slot entry edges b and d of the mandrel grip the sandwich of plates and separators causing them to kink about the sharp slot entry edges, serving to positively attach the plate and separator strip members to the mandrel during the initial rotation. An initial rotation of approximately 120° and the relationship of the winder to the elements being wound is shown in FIG. 5. The rollers 40, 42 and trained belt 46 make direct circumferential contact with the strip members as they are being wound, thereby controlling the geometry and stack pressure amongst the elements and also preventing pullout from the mandrel during the initial rotation.

Further rotation results in the partial wind position shown in FIG. 6. The sizing rollers together with the associated belts have been withdrawn in the direction of the arrows by means 48, 48' in accordance with cam or other control configured to properly size the coiled element during progression of the wind. Further winding results in completion of the coiled element of desired outside diameter, which is shown inserted in a battery container 62 in FIG. 7. Note that the coiled element has been withdrawn from the mandrel so that a void 64 approximating the shape of the withdrawn mandrel is left at the axis of the spirally wound cell.

It will be understood that the invention is capable of a variety of modifications and variations which will become apparent to those skilled in the art upon reading the specification, such modifications intended to be part of the invention as defined in the appended claims.

What is claimed is:

1. A mandrel useful in winding together a plurality of flexible strip members, comprising:
    a first curvilinear perimetric driving portion;
    a second curvilinear perimetric driving portion juxtaposed from the first driving portion;
    an isthmus interconnecting the first and second driving portions and thereby defining with the first and second driving portions juxtaposed slots for receiving ends of the flexible strip members to be wound; and
    said first and second driving portions being offset generally laterally with respect to one another, in a direction parallel to the centerline passing through the openings of the slots, and in an amount from about 70 to about 85 percent of the combined thickness of the flexible strip members to be wound.

2. The mandrel of claim 1 wherein each of the driving portions has a curvilinear driving surface which terminates at one end in a substantially sharp corner at the respective slot openings.

3. The mandrel of claim 1 wherein the first and second driving portions are offset laterally by an amount from about 50 to 90 percent of the width of the corresponding slot.

4. A winding apparatus comprising the mandrel of claim 1 together with a plurality of sizing rolls mounted for movement away from the mandrel and spaced closely thereto, and means for feeding the flexible strip members into engagement with said slots.

5. The apparatus of claim 4 wherein endless belts are trained about pairs of said sizing rolls adapted to make circumferential contact with the flexible strip members during winding.

6. The mandrel of claim 1 wherein the first and second driving portions are offset laterally by an amount from about 60 to about 80 percent of the width of the corresponding slot.

7. The mandrel of claim 1 wherein the juxtaposed slots have substantially uniform width openings.

8. A method for winding together a plurality of flexible strip members to form a coiled element comprising:
    feeding the strip members from opposite directions into juxtaposed slots of a driving mandrel, said mandrel having curvilinear driving surfaces terminating in generally pointed corners at the junctures with the respective slot openings, the curvilinear driving surfaces being offset generally laterally with respect to one another, in a direction parallel to the centerline passing through the openings of the slots, and in an amount from about 70 to about 85 percent fo the combined thickness of the flexible strip members to be wound and a tangent drawn to the curvilinear surfaces immediately adjacent the pointed corners forming, with the respective adjoining slot opening surfaces, an acute angle; thereafter rotating the mandrel in the direction which wraps the strip members sharply around the pointed corners, and continue rotating the mandrel until the coiled element is formed.

9. The method of claim 8 including simultaneous with the step of rotating the mandrel, the step of compressing radially inwardly the coiled element along circumferential portions thereof as the coiled element is being wound.

10. A mandrel for winding into a coiled element a plurality of flexible strip members, at least one of which is compressible, to form an electrochemical wound element, comprising:
   a shaft portion;
   a first driving portion projecting from the shaft and having an outer curvilinear perimetric surface and an inner strip receiving surface;
   a second driving portion projecting from the shaft and having an outer curvilinear perimetric and an inner strip receiving surface;
   said first and second driving portions being juxtaposed with their strip receiving surfaces being spaced face-to-face and with
   said first and second driving portions being offset generally laterally with respect to one another, in a direction parallel to the centerline passing through the openings of the inner strip receiving surfaces, an amount from about 70 to about 85 percent of the combined uncompressed thickness of the flexible strip members to be wound.

11. The mandrel of claim 10 wherein the respective inner strip receiving surfaces of the first and second driving portions interconnect to form a through slot.

12. The mandrel of claim 10 wherein the first and second driving portions are offset laterally an amount from about 70 to 85 percent of the combined thickness of the flexible strip members to be received in an inner strip receiving surface.

13. A mandrel useful in winding together a plurality of flexible strip members, comprising:
   a first curvilinear perimetric driving portion;
   a second curvilinear perimetric driving portion offset generally laterally from the first driving portion;
   an isthmus interconnecting the first and second driving portions and thereby defining with the first and second driving portions juxtaposed slots for receiving ends of the flexible strip members to be wound; and
   said mandrel including aligning openings penetrating the first and second driving portions and intersecting a slot adjacent the isthmus, for transmitting a light beam therethrough to establish a light-controlled external circuit.

14. A mandrel for winding into a coiled element a plurality of flexible strip members, comprising:
   a shaft portion;
   a first driving portion projecting from the shaft and having an outer curvilinear perimetric surface and an inner strip receiving surface;
   a second driving portion projecting from the shaft and having an outer curvilinear perimetric and an inner strip receiving surface;
   said first and second driving portions including aligning openings penetrating therethrough and intersecting said respective inner strip receiving surfaces of each driving portion, for transmitting beam means to control the extent to which the flexible strip members penetrate the respective inner strip receiving surfaces; and
   said first and second driving portions being juxtaposed with their strip receiving surfaces being spaced apart and with the curvilinear perimetric surfaces of each of the driving portions being offset laterally relative to one another.

15. The mandrel of claim 14 wherein the respective strip receiving surfaces of the first and second driving portions interconnect to form a through strip-receiving slot.

* * * * *